United States Patent
Schweiker et al.

(10) Patent No.: US 6,853,777 B2
(45) Date of Patent: Feb. 8, 2005

(54) IMMERSION AGENT, COUPLING DEVICE AND METHOD FOR COUPLING AN OPTICAL WAVEGUIDE

(75) Inventors: Wolfgang Schweiker, Feldkirchen-Westerham (DE); Angela Rief, Muchen (DE); Gunter Zeidler, Germering (DE); Bernard Deutsch, Otterfing (DE)

(73) Assignee: Corning Incorporated, Corning, NY (US)

( * ) Notice: Subject to any disclaimer, the term of this patent is extended or adjusted under 35 U.S.C. 154(b) by 210 days.

(21) Appl. No.: 10/203,047

(22) PCT Filed: Jan. 26, 2001

(86) PCT No.: PCT/DE01/00331

§ 371 (c)(1),
(2), (4) Date: Nov. 27, 2002

(87) PCT Pub. No.: WO01/57563

PCT Pub. Date: Aug. 9, 2001

(65) Prior Publication Data

US 2003/0138211 A1 Jul. 24, 2003

(30) Foreign Application Priority Data

Feb. 2, 2000 (DE) .......................................... 100 04 396

(51) Int. Cl.$^7$ .................................................. G02B 6/30
(52) U.S. Cl. ..................................... 385/49; 385/88
(58) Field of Search .............................. 385/39, 49, 27, 385/14–15, 52, 88–94

(56) References Cited

U.S. PATENT DOCUMENTS

| 5,077,821 A | | 12/1991 | Makel et al. |
| 5,392,372 A | * | 2/1995 | Kurata et al. .................. 385/88 |
| 6,075,911 A | * | 6/2000 | Goto ........................... 385/31 |

FOREIGN PATENT DOCUMENTS

EP           0859255 A2     8/2002

* cited by examiner

*Primary Examiner*—Diane I. Lee
*Assistant Examiner*—Lisa M. Caputo
(74) *Attorney, Agent, or Firm*—Walter M. Douglas

(57) ABSTRACT

The invention is directed to an immersion agent that can be used to couple optical waveguides to optical components. The invention is also directed to the use of an immersion agent, a coupling arrangement and a method for coupling optical waveguides to other optical components; for example, an optical chip.

25 Claims, 1 Drawing Sheet

IMMERSION AGENT, COUPLING DEVICE AND METHOD FOR COUPLING AN OPTICAL WAVEGUIDE

PRIORITY APPLICATION

This application claims the benefit of priority under 35 U.S.C. §119 of German Patent Application No. 100 04 296.8, filed Feb. 2, 2000, and is a national stage filing under 35 U.S.C. §371 of PCT application PCT/DE01/00331, filed Jan. 26, 2001.

FIELD OF THE INVENTION

The invention relates to an immersion agent, a coupling arrangement and a method for coupling at least one optical waveguide (LWL) to an optical component (chip) or for connecting an optical waveguide to an optical component.

BACKGROUND OF THE INVENTION

An optical coupling arrangement is used to inject light or couple light between two optical waveguide end faces; for example between the end face of an optical waveguide fiber composed of a core and cladding, and the opposite end face of a waveguide structure present on a chip. Such coupling arrangements are used, for example, in optical filters that operate according to the phased array principle. These have an injection face in which light enters at a specific point, the output wavelength of the optical filter depending on the geometric position of the injection point. Optical filters operating according to the phased array principle are used in particular as multiplexers or demultiplexers in the field of optical telecommunications transmission as they have low insertion attenuation and high crosstalk suppression.

German patent application DE 44 22 651.9 describes what is referred to as a phased array filter whose central wavelength is defined by positioning the optical waveguide fiber which injects the light into the chip waveguide structure, and can thus be precisely aligned. This is done by displacing the waveguide end faces in relation to one another.

It has already been proposed to change the position of the end face of the optical waveguide with respect to the injection face of the chip by virtue of the fact that an element with a variable length is fitted with the fiber and the latter is thus displaced in parallel with the direction of expansion of the element with a variable length.

In order to implement optical coupling between an optical waveguide, an optical waveguide fibre or fiber array and an optical element containing active and/or passive elements, the optical waveguides must be held in a defined position with respect to the injection face of the chip and connected to the corresponding waveguide structure. This is usually carried out by directly bonding the fiber ends to the chip. However, in the above mentioned cases, direct bonding or welding of the fiber ends to the chip is not desired as this would change the necessary relative movement between the fiber and the chip.

SUMMARY OF THE INVENTION

The invention is directed to an immersion agent or material that can be used to couple at least one optical wave to an optical component. In accordance with the invention, the immersion agent is a transparent elastomer material having, among other characteristics, a modulus of elasticity less than 200 N/cm$^2$. In the preferred embodiments of the invention, the immersion agent is a two part material that can be mixed, in selected ratios to attain a selected degree of hardness, prior to use in coupling an optical waveguide to an optical component.

DETAILED DESCRIPTION OF THE INVENTION

Figure 1:
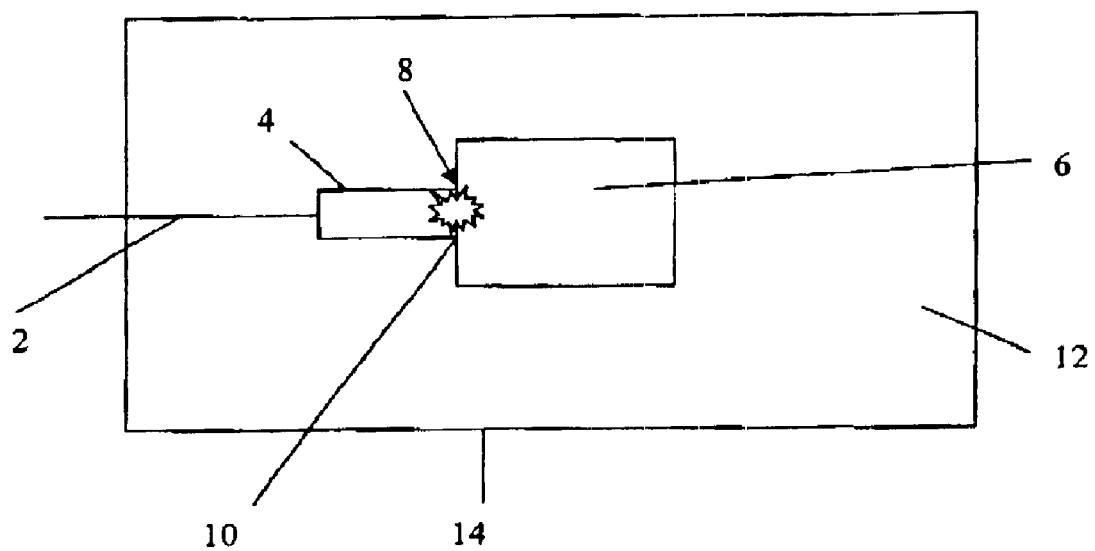
FIG. 1 illustrates a coupling arrangement between an optical fiber and an optical component using an immersion agent.

In accordance with the present invention, in order to improve the insertion attenuation and reduce the power fluctuations, an immersion agent has been introduced between the fiber and the chip. In particular a stable gel, for example, an additional crosslinked silicone rubber is used as the immersion agent. The silicone rubber is composed here of two components whose mixing ratio is 1:1 so that the rubber hardens completely after its introduction. The hardening is considered necessary in order to prevent the immersion agent flowing away from the joining location of the optical waveguide and the optical component. In alternate embodiments as described below other mixing ratios can be used to obtain a different degree of hardness of the cured immersion agent.

As an enclosed volume is formed between the fiber and its fiber mount on the one hand and the chip on the other, fractures or vacuoles (small vacuum bubbles) which considerably increase the insertion attenuation of the component are formed in the immersion gel during cooling as a result of shrinkage. In addition, the formation of fractures is also promoted by the above mentioned relative movement between the fiber and chip.

The invention is therefore based on the object of making available an optical coupling between an optical waveguide, for example, a fiber or a fiber array, and an optical component/chip that has a low insertion attenuation.

In order to achieve this object, an immersion agent for coupling optical waveguides to an optical chip is characterized in that a transparent elastomer serves as the immersion agent, the tensile strain at break of the elastomer being greater than 300% and its modulus of elasticity having a value which is smaller than 200 N/cm$^2$. The immersion agent is therefore adjusted to be so soft that in the case of cooling sufficient gel continues to flow out of the edge regions of the immersion and stresses which lead to fractures and vacuoles cannot build up. On the other hand, the immersion material is not so liquid that it can flow out of the volume between the optical waveguide and chip, thus ensuring that the immersion material remains in this intermediate space during the entire service life of the component.

One advantageous configuration of the immersion agent according to the invention is c that the matrix of the immersion agent contains a non-crosslinked proportion of a liquid phase. That is, the immersion agent is not completely crosslinked. By correspondingly adjusting the mixing ratio, for example of a twocomponent immersion agent, it is thus possible to adjust the immersion agent so that it is soft in the desired way.

A further advantageous configuration of the immersion agent according to the invention is c that the immersion agent contains a liquid phase proportion of 1 to 10% of an immersion liquid with a low vapor pressure. The addition of a liquid phase proportion is a simple alternative to generating an immersion agent with the properties mentioned at the beginning.

A further advantageous configuration of the immersion agent according to the invention is that an immersion oil or a softener which is selected as a function of the elastomer is used as the immersion liquid, the properties of the immersion agent being easily adjustable by adding the immersion oil.

A further advantageous configuration of the immersion agent according to the invention is that the immersion agent is silicone rubber, and in that the immersion liquid is a silicone softener, in particular silicone oils. As the silicone rubber has a pronounced degree of adhesiveness even in the state in which it is not completely crosslinked, stability of the coupling of the component is ensured over its entire service life.

A further advantageous configuration of the immersion agent according to the invention is that the immersion agent is epoxy acrylate, and in that the immersion liquid is an epoxy acrylate softener, in particular polyisobutylene.

A further advantageous configuration of the immersion agent according to the invention is that the immersion agent is urethane acrylate, and in that the immersion liquid is a urethane acrylate softener, in particular polyisobutylene.

The two last-mentioned immersion agents are also referred to as radiation crosslinked elastomers that constitute an advantageous alternative to silicone rubber. These immersion agents can also have the properties required of the immersion agent according to the invention.

A further advantageous configuration of the immersion agent according to the invention is that the immersion liquid or the softener is an aliphatic or aromatic oil so that a series of softeners is available, it being possible to select the specific softener according to the respective peripheral conditions.

A further advantageous refinement of the immersion agent according to the invention is that the silicone rubber is composed of two components, the mixing ratio of the components being 0.5:1 to 0.9:1. In the case of silicone rubber, for example in the case of the silicone rubber WACKER SilGel® 612 from Wacker-Chemie GmbH, a mixing ratio of the components of 1:1 is recommended in order to obtain complete crosslinking of the silicone rubber. If this mixing ratio is changed in the way stated, a silicone rubber is obtained which has the softness required according to the invention.

A further advantageous refinement of the immersion agent according to the invention is that the immersion agent has an adhesive force per unit area which is greater than half the material breaking stress of the elastomer, it being advantageously ensured that the immersion agent does not become detached from the coupling face of the fiber or of the chip when a shrinkage process occurs.

A further advantageous refinement of the immersion agent according to the invention is that the transformation point/glass transition point of the immersion agent $T_g$ is below 0° C. This advantageously ensures that the immersion agent has the desired elastic properties over the entire operating temperature range of the coupling.

A further advantageous refinement of the immersion agent according to the invention is that the refractive index of the immersion agent has a value between n=1.3 and n=1.7, in particular between n=1.4 and n=1.5. By thus selecting the refractive index, the coupling arrangement is adapted in an optimum way to the refractive indices of the fibers or of the chip, and the coupling attenuation is correspondingly reduced.

In order to achieve the above mentioned object, an arrangement for coupling optical waveguides, for example optical fibers or a fiber array, to an optical component/chip is characterized in that
 (a) an immersion agent of the above mentioned type is used, in that
 (b) the distance between an end face of the optical waveguide and a coupling face of the chip is 2 μm to 20 μm, and in that
 (c) the volume of the immersion agent applied to the coupling point is less than 5 μl.

In trials it has been shown that both the properties of the immersion agent and the spatial conditions in the region of the coupling arrangement, in particular the distance between the optical waveguides and the coupling face of the chip and the volume of immersion agent, influences the quality of the coupling and the service life of the coupling arrangement. The formation of fractures or vacuoles can advantageously be reduced further by this arrangement if the distance between a coupling face of the optical waveguide and the coupling face of the chip is between 2 μm and 20 μm, and if the volume of the immersion agent applied to the coupling point is below 5 its. If the distance between the coupling faces is less than 2 μm, there is the risk of the coupling faces touching one another or of the friction between the coupling faces being so large that the immersion agent becomes detached from the coupling faces. If the distance is greater than 20 μm, the attenuation increases considerably as a result of the immersion agent. On the other hand, compliance with these parameters ensures that if a shrinkage process occurs sufficient immersion agent can flow from the outside into the space between the coupling faces so that the formation of vacuoles is avoided.

A further advantageous refinement of the arrangement according to the invention is one in which the optical waveguide fiber is arranged for coupling in a ferrule, and is characterized in that the fiber is held in a ferrule, that the ferrule has a reduced diameter at its end side, and that the coupling face of the chip is also reduced. This ensures that the distance from the edge region of the volume between the two coupling faces and the center of this region becomes smaller so that if a shrinkage process occurs the gel can better and more quickly compensate stresses which possibly occur in order to avoid fractures and the formation of vacuoles.

A further advantageous refinement of the arrangement according to the invention is that the coupling device is surrounded by a sealing compound which has the same components as the immersion material but is adjusted so as to be harder, and is in particular completely crosslinked. By filling the coupling point with casting material, mechanical shock stresses and vibrations are then only transmitted to the coupling arrangement in an attenuated fashion. If the sealing compound is made of the same immersion material as the immersion material for the coupling, for example, also of silicone rubber, chemical compatibility between the two materials is advantageously obtained, which can differ only in the degree of hardening or in an addition of softener in the case of the immersion agent at the coupling point. In addition, the coefficients of expansion of the two materials are essentially identical so that when there are expansion or shrinkage processes no additional compressive forces or tensile forces are exerted on the immersion material at the coupling point. Finally, the elastomer immersion material is advantageously protected against flowing away by the sealing compound.

In order to achieve the above mentioned object, a method for coupling optical waveguides, for example optical fibers or a fiber array, to an optical chip is characterized in that (a) an optical waveguide or a ferrule connected thereto is moved to a distance of 2 to 20 μm away from a coupling face of the chip, in that (b) an immersion material of the above mentioned type is prepared, in that (c) the immersion material is dispensed at the coupling point to a quantity of approximately 5 μl, and in that (d) the immersion material is allowed to harden in accordance with the mixing ratio.

Maintaining the spatial relationship between the coupling face of the optical waveguide and the coupling face of the chip, that is to say selecting the distance between these coupling faces, ensures, without a large degree of expenditure during the coupling method, that during a shrinkage process or expansion process, a considerable formation of fractures or vacuoles occurs even while the coupling arrangement is operating. The coupling method itself is as simple here as in the prior art so that no additional expenditure is necessary to implement the invention. Maintaining a relatively large distance between the coupling faces also contradicts the previous practice according to which it was attempted to arrange the two coupling faces as close to one another as possible in order to improve the coupling of the light beam from the optical waveguide into the chip. However, this coupling is surprisingly worse if the difference between the coupling faces is too low because other mechanical and stress influences then act to the effect that the immersion material can no longer bring about adequate optical coupling between the fiber and the chip.

A further advantageous refinement of the method according to the invention is that, after the hardening of the immersion material, a sealing compound which has the same components as the immersion material but is adjusted so as to be harder, and is in particular completely crosslinked, is cast around the coupling point. As the same starting material is used for sealing the component and also as an immersion material for the coupling, this material merely has to be adjustable to different hardnesses in order to be suitable for this purpose. By using the same starting material, not only the above mentioned advantages are obtained but also stockholding is improved as it is not necessary to keep different materials for the two purposes of use in stock.

A further advantageous refinement of the method according to the invention is that the immersion material or the sealing compound is allowed to harden at normal operating temperature. This advantageously avoids the situation in which the material hardens at a temperature which differs considerably from the normal operating temperature so that the component is already subjected to stresses when it is moved from the production site to the location where it is to be used. These stresses then occur in addition to the "normal" stress loading that occurs during the operation of the component. If the original hardening of the component has taken place at the normal operating temperature, the formation of fractures and vacuoles will also be less in the cases at the operating site if the component has in the meantime been located in environments with different temperatures.

A further advantageous refinement of the method according to the invention is c that the immersion material whose matrix contains a proportion of a liquid phase is manufactured in that a completely hardened immersion material which is applied to the coupling point is treated with a softener. As a result of this method, already existing coupling arrangements can advantageously be protected against future fractures and the formation of vacuoles. In other words, by applying a suitable oil or another softener liquid to a hardened immersion material the immersion material is placed in a state which is suitable for the purposes according to the invention.

A further advantageous refinement of the method according to the invention is that aliphatic or aromatic oils are used as immersion oils. These oils are also suitable for the subsequent conditioning of the immersion material for the purposes of the invention so that the desired purpose can be achieved without relatively large additional expenditure.

Exemplary embodiments of the invention will now be described with reference to the appended drawing in which a coupling arrangement for coupling an optical waveguide fiber to an optical component/chip is illustrated schematically.

FIG. 1 illustrates a coupling arrangement between an optical fiber 2 which is anchored in a ferrule 4 and an integrated optical component, for example, a chip 6 with waveguides (not shown) to be coupled. An immersion agent or immersion gel 10 whose volume of approximately 5 μl or less fills the intermediate space between the end side of the fiber 2 or the ferrule 4 and the coupling face on the chip 6 as well as an edge region surrounding this coupling region is provided at the coupling point 8. The parts of the coupling arrangement are sealed by a sealing compound 12 in a housing 14.

The immersion agent 10 has the following properties:

(a) It has a refractive index between 1.3 and 1.7; preferably between 1.4 and 1.5.

(b) It is a transparent elastomer with a tensile strain at break of over 300%. The tensile strain at break can easily have values of 1000%. Given the coupling arrangements mentioned at the beginning, which permit a movement between the fiber and the chip, lateral displacements between the two coupling faces of 30 to 40 μm occur. Given a distance between the two coupling faces of 3 μm, a tensile strain at break of approximately 1000% occurs.

(c) The immersion material has a modulus of elasticity below 200 N/cm$^2$, preferably below 100 N/cm$^2$.

(d) The immersion material has a transformation point/glass transition point $T_g$ below 0° C.

The immersion material has the required softness or adhesiveness by virtue of the fact that, for example in the case of silicone rubber, the mixing ratio of the two components of 0.5:1 to 0.9:1 is selected. Alternatively, a liquid phase proportion of softener or immersion oil to a quantity of 0% to 10% of the quantity of the immersion material can be added, the immersion liquid having a low vapor pressure.

The immersion agent has an adhesive force per unit area in comparison with quartz glass of at least half the material breaking stress of the elastomer.

The sheet thickness of the immersion material between the coupling faces is between 20 μm and 20 μm, while the overall length of the immersion material per fiber coupling is below 5 μm.

The material of the sealing compound is the same starting material as the immersion material, but the sealing compound is completely hardened. The sealing compound advantageously protects the elastomer immersion material against flowing away.

What is claimed is:

1. An immersion agent for coupling at least one optical waveguide to an optical component, the immersion agent comprising a transparent elastomer, wherein the tensile strain at break of the elastomer is greater than 300% and its modules of elasticity is smaller than 200 N/cm$^2$.

2. The immersion agent according to claim 1, wherein the matrix of the immersion agent further comprises a non-crosslinked proportion of an immersion liquid phase.

3. The immersion agent according to claim 2, wherein the immersion agent is silicone rubber and the immersion liquid is a silicone softener.

4. The immersion agent according to claim 3, wherein the immersion liquid is a silicone oil.

5. The immersion agent according to claim 3, wherein the silicone rubber is mixed from two components, the mixing ratio of the components being in the range of 0.5.1 to 0.9.1.

6. The immersion agent according to in claim 2, wherein the immersion agent is urethane acrylate and the immersion liquid is a urethane acrylate softener.

7. The immersion agent according to claim 6, wherein said liquid is polyisobutylene.

8. The immersion agent according to claim 1, wherein the immersion liquid is immersion oil or a softener which is selected as a function of the elastomer.

9. The immersion agent according to claim 8, wherein the softener is an aliphatic or aromatic oil.

10. The immersion agent according to claim 7, wherein the immersion agent is epoxy acrylate, and the immersion liquid is an epoxy acrylate softener.

11. The immersion liquid according to claim 10, wherein said liquid is polyisobutylene.

12. The immersion agent according to claim 1, wherein the immersion agent has an adhesive force per unit area which in comparison with glass is greater than half the material breaking stress of the elastomer.

13. The immersion agent according to claim 1, wherein the transformation point/glass transition point of the immersion agent $T_g$ is less than 0° C.

14. The immersion agent according to claim 1, wherein the refractive index of the immersion agent is in the range of approximately 1.3 to 1.7.

15. The immersion agent according to claim 14, wherein the refractive index of the immersion agent is in the range of approximately 1.4 to 1.5.

16. An arrangement for coupling at least one optical waveguide to an optical component, said arrangement comprising
　(a) and immersion agent comprising a transparent elastomer, wherein the tensile strain at break of the elastomer is greater than 300%, and its modulus of elasticity is smaller than 200 N/cm$^2$
　(b) the distance (d) between an end face of the optical waveguide and a coupling face of the component is in the approximate range of 2 $\mu$m to 20 $\mu$m, and
　(c) the volume of the immersion agent applied to the coupling point (8) is less than 5 $\mu$l.

17. The arrangement according to claim 16, wherein the optical waveguide fiber being arranged for coupling in a ferrule, said ferrule having a reduced diameter at its end side and the coupling face of the component is also being reduced to accommodate said ferrule.

18. The arrangement as claimed in claim 16, wherein the coupling device is surrounded by a two component sealing compound which has the same components as the immersion agent, but wherein is adjusted so as to be harder by increasing the amount of hardening agent used in the sealing compound.

19. The arrangement as claimed in claim 18, wherein the immersion agent is completely cross-linked.

20. A method for coupling at least one optical waveguide to an optical component, said method comprising:
　(a) moving an optical waveguide and/or a ferrule connected thereto to a distance of in the approximate range of 2 to 20 $\mu$m from a coupling face of the optical component;
　(b) preparing an immersion agent comprising a two component mixed in a ratio in the range of 0.5:1 to 0.9:1;
　(c) depositing immersion agent at the coupling point is an amount of approximately 5 $\mu$l; and
　(d) allowing the immersion agent to harden in accordance with the mixing ratio.

21. The method as claimed in claim 20, wherein after hardening of the immersion agent, a sealing compound which has the same components as the immersion agent but is adjusted so as to be harder, is cast around the coupling point.

22. The method according to claim 21, wherein the immersion material is completely cross-linked.

23. The method according to claim 22, wherein the immersion material or the sealing compound is allowed to harden at normal operating temperature.

24. The method according to claim 23, wherein the immersion material whose matrix contains a proportion of a liquid phase is manufactured in that a completely hardened immersion material which is applied to the coupling point is treated with a softener.

25. The method according to claim 24, wherein aliphatic or aromatic oils are used as immersion oils.

* * * * *